United States Patent [19]
Chang

[11] 3,907,606
[45] Sept. 23, 1975

[54] HEAT SHIELD FOR TEMPERATURE SENSORS

[75] Inventor: Robert C. C. Chang, Sao Paulo, Brazil

[73] Assignee: Sun Oil Company of Pennsylvania, Philadelphia, Pa.

[22] Filed: Jan. 25, 1974

[21] Appl. No.: 436,403

[52] U.S. Cl. .................................. 136/233; 73/359
[51] Int. Cl.² ........................................ H01L 35/00
[58] Field of Search ...................... 73/359; 136/233

[56] References Cited
UNITED STATES PATENTS

| | | | |
|---|---|---|---|
| 2,048,680 | 7/1936 | Bird et al. | 73/359 |
| 2,048,681 | 7/1936 | Davidson et al. | 73/359 |
| 3,263,952 | 8/1966 | Fisher | 73/359 |
| 3,535,165 | 10/1970 | Webb | 136/233 |

*Primary Examiner*—Verlin R. Pendegrass
*Attorney, Agent, or Firm*—George L. Church; Donald R. Johnson; Frank A. Rechif

[57] ABSTRACT

For tubewall temperature measurement inside a process heater (fired heater), thermocouples are mounted inside the heater in contact with the tubewalls, by means of mounting blocks which are welded to the tubewalls. A radiant-heat shield is installed over each thermocouple mounting block and over a portion of the length of the corresponding sheathed thermocouple, between the thermocouple and the heat source (burner).

6 Claims, 3 Drawing Figures

HEAT SHIELD FOR TEMPERATURE SENSORS

This invention relates to the protection of temperature sensors, and more particularly to a heat shield for preventing overheating of thermocouples.

In petroleum refineries, as well as in other process industries employing tube-type process heaters, it is desirable to monitor the temperature at various points inside the furnace. For this purpose, tubewall thermocouples are utilized as a criterion for controlling process heater operations. More specifically, the reliable measurement of tubewall temperatures is necessary in order to prolong tube life by preventing overheating; to state this another way, such measurement permits the operator to adjust operating conditions to keep below maximum allowable temperatures and at the same time obtain the maximum possible throughput in spite of tube fouling.

In process heater tubewall temperature measurement, the temperature sensors (thermocouples) have to withstand severe environmental conditions. In a typical installation, the tip of a sheathed thermocouple is first inserted in a hole provided in a metallic block which has been welded to the outer wall of a heater tube, and is then peened tight in this hole. The thermocouple is then held firmly to the tube with stainless steel bands; between the first of these bands and the block the thermocouple is bowed or looped outwardly, away from the tube, to provide a stress relief zone.

In the tubewall thermocouple installation previously described, there are several significant factors which have caused premature thermocouple failures, and also errors in tubewall temperature measurement.

In the first place, the stress relief zone is the region in which the thermocouple is frequently subject to intense heating; in this zone, the thermocouple sheath can be heated to 1,800°F. or higher. This intense heat can significantly reduce the service life of the thermocouple. More particularly, this heat could actually destroy the sheath, or it could cause overheating, thereby encouraging grain growth in the Alumel wire. The grains would embrittle the wire, so that any slight mechanical vibration would ultimately cause the wire to break at the grain boundary.

Furthermore, the high sheath temperature (in the stress relief zone) can cause error in temperature measurement, due to heat flow by conduction to the thermocouple tip.

Another source of measurement error is the larger effective area, provided by the thermocouple mounting block (as compared to the tubewall area without the block), which is exposed to heat transfer by radiation and convection. This would tend to raise the block temperature (and hence the thermocouple tip temperature) above the actual tubewall temperature.

Therefore, an object of the invention is to provide a means for preventing overheating of a tubewall temperature thermocouple.

Another object is to provide a means for minimizing radiant heating of a temperature sensor mounted in a process heater.

A further object is to provide a novel radiant heat shield for a temperature sensor.

A still further object is to provide an arrangement for reducing measurement errors due to radiant heat transfer to a temperature sensor so located as to be subjected undesirably to such radiant heat.

Still another object is to provide a means for reducing measurement errors due to radiant heat transfer to a tubewall temperature thermocouple.

The objects of this invention are accomplished, briefly, in the following manner: An open-ended metallic hood, sized to cover the sheathed thermocouple in the stress relief zone of the installation as well as the mounting block of the installation, is attached to the mounting block to provide a radiant-heat shield between the thermocouple installation and the heat source (burner) of the process heater.

A detailed description of the invention follows, taken in conjunction with the accompanying drawing, wherein.

Figure 1:
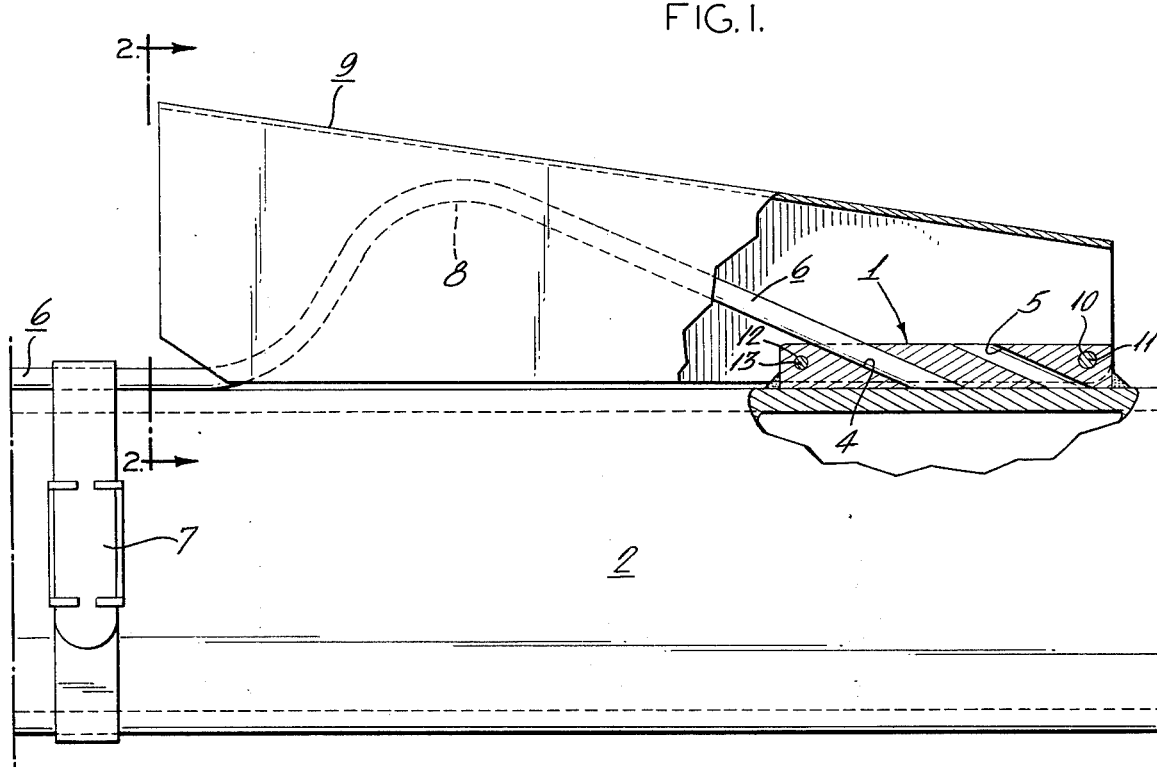
FIG. 1 is an elevational view partially in section illustrating a heat shield according to this invention in position on a heater tube.
Figure 2:
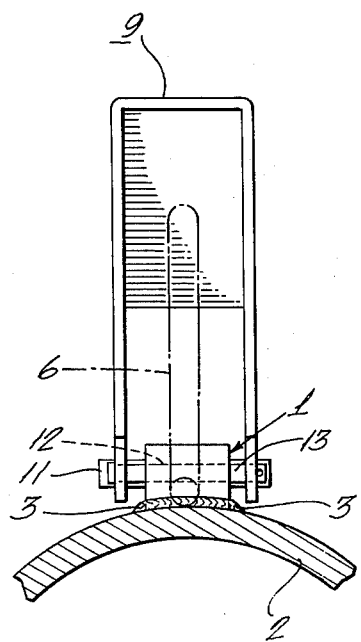
FIG. 2 is an enlarged fragmentary end (side) view of the FIG. 1 assembly, looking in the direction 2—2 of FIG. 1.

Now referring to the drawing, a thermocouple mounting or attachment block 1, preferably made of the same metal as the heater tubes, is welded on all four edges to the outer wall of the heater tube 2, as indicated at 3 (FIG. 2). The heater tube 2 is one of a plurality of similar heater tubes embodied in a tube-type process heater of conventional type. The tubes are centered along the circumference of a circle inside a hollow cylindrical heater and near the outer wall thereof, the axes of the several tubes being parallel to each other and also to the axis of the cylinder. The heat source (burner, for example) is located in the central (free) area of the hollow cylinder. The block 1 is located on the inner side of the heater tube 2 (that is, on the side toward the heat source); thus, the heat source would be located generally above the block 1 in FIG. 1.

By way of example, the block 1 may be 7/16 inch by 7/16 inch by 3 inches in size, and has two holes 4 and 5 drilled therethrough at an angle of say 30° for the insertion of a thermocouple. The two holes enable the thermocouple to be replaced at least once without the necessity of welding a new block on the tube 2.

A sheathed thermocouple 6, for example a Chromel-Alumel thermocouple insulated with magnesium oxide and then encased in a stainless steel sheath, is inserted into a block hole such as 4 with its tip touching the heater tube 2. After insertion, the thermocouple 6 is peened tight in its hole. The thermocouple 6 is held firmly to the tube 2 with stainless steel bands or straps, the first one of which is illustrated at 7.

Between the initial strap 7 and the mounting block 1, the sheathed thermocouple 6 is bowed or looped outwardly as at 8, away from the tube 2, to provide a stress relief zone, the high point of loop 8 being spaced say 2 inches away from the heater tubewall.

According to this invention, in order to protect the thermocouple and also to reduce the measurement error due to overheating of the thermocouple sheath and mounting block, there is utilized a radiation shield, so designed that it will greatly reduce the heating of the thermocouple installation by radiation, but at the same time have very little effect on the convective and conductive modes of heat transfer. The radiation shield (heat shield) comprises an open-ended metallic hood 9, of U-shaped cross-section (see FIG. 2), which covers the sheathed thermocouple 6 in the stress relief zone (at the bowed or looped portion 8), as well as the block 1. It should be apparent that, since the hood "covers" the stress relief zone of the thermocouple, and also the mounting block, the hood is located between the furnace or heater heat source (burner) and the thermocouple.

The hood 9 is preferably fabricated from 1/32 inch stainless steel, and is coated on both inside and outside (for thermal insulation purposes) with a refractory material such as magnesium zirconate. Hood 9 is sized (dimensioned) to cover (but not closely or snugly) the thermocouple stress relief zone 8 and the mounting block 1, as illustrated in FIGS. 1 and 2.

Hood 9 is attached to block 1, in order to maintain it in position above heater tube 2 (see FIG. 2). A hinge pin or shaft 11 is inserted through a set of aligned clearance holes such as 10 provided in the hood 9 and the block 1, at the end of the block remote from the length of the sheathed thermocouple 6. Another set of aligned clearance holes such as 12 is provided in the hood and the block, at the end of the block adjacent the length of the sheathed thermocouple 6. These latter holes accommodate a lock pin or shaft 13, to secure the hood to the block 1. The construction described, wherein the hood or shield 9 is attached to the thermocouple mounting block, is such that it can be field installed on existing thermocouple blocks.

Figure 3:
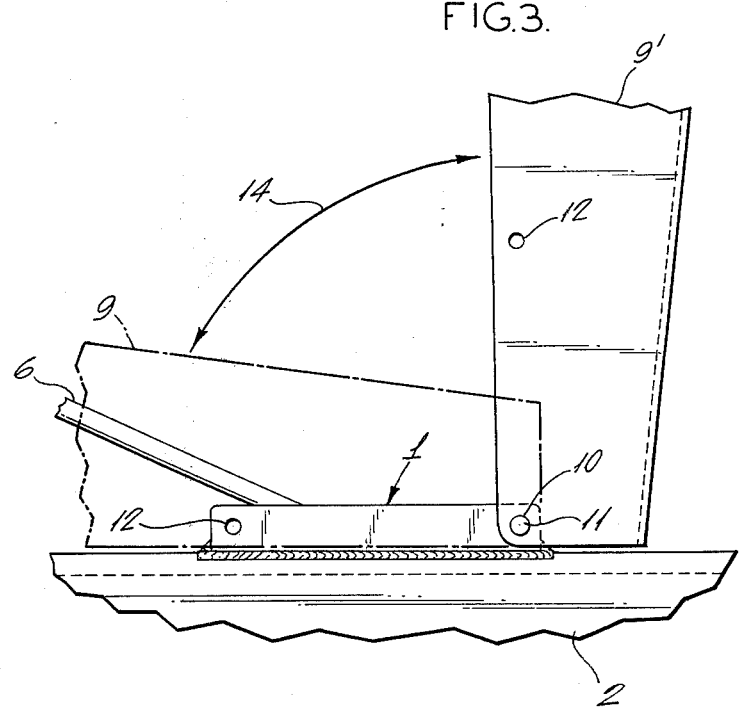
FIG. 3 is a fragmentary view similar to FIG. 1, illustrating the pivoting of the shield upwardly for access purposes.

Refer now to FIG. 3. When it is desired to gain access to the thermocouple 6 and/or the mounting block 1, the lock pin 13 may be removed from holes 12, following which the hood 9 may be pivoted or swung outwardly (i.e., upwardly in FIG. 3) about the axis provided by the hinge pin 11, along the arcuate path indicated at 14, to an "open" or "access" position indicated at 9'.

The imperforate metallic hood 9 acts as a radiant-heat or radiation shield, which minimizes radiant heating of the thermocouple sheath (in the stress relief zone 8) and block 1, thereby preventing overheating of the sheath (and the adverse effects this would entail). At the same time, measurement errors, due to radiant heat transfer to the sheath and to the block, are reduced.

The hood 9 has a minimal effect on convective heat transfer, since the hood, being open ended, would not significantly restrict the convective air flow.

The hood of this invention would have a minimal effect on conductive heat transfer, since the only contacts between the block and the hood are through the hinge and lock pins or shafts (and these are quite small in size).

As an alternative to the two-hole mounting block 1 hereinabove described, there could be used to good advantage the thermocouple mounting assembly described in U.S. Pat. No. 3,263,952, dated Aug. 2, 1966.

Although this invention has been described in connection with thermocouples, it is also applicable to other types of heat detectors (temperature sensors).

The invention claimed is:

1. A system for allowing a temperature sensor to sense the temperature of a heated body which the sensor is in thermal contact with while protecting the sensor from being irradiated by a heat source in the system and comprising:

a. a body, the temperature of which is to be measured;
   b. a source of heat;
   c. a temperature sensor in thermal contact with said body for measuring the temperature of said body; and
   d. a hood means interposed between said heat source and said temperature sensor for reducing the radiation directly incident upon said temperature sensor to allow the sensor to more accurately measure the temperature of said body and also for allowing the service life of the sensor to be extended, said hood means including a top surface directly interposed between said heat source and said sensor and two side surfaces extending from said top surface down to said body, said hood means further defining an opening across its bottom with said opening fitting against said object.

2. A system as set forth in claim 1 and wherein:

a. said temperature sensor comprises a thermocouple including a temperature measuring tip in contact with said body and a stress relief zone adjacent to said temperature measuring tip wherein the thermocouple bows significantly away from said body with the result that said stress relief zone may be subjected to intense heating which would adversely affect the thermocouple; and
   b. said hood means is interposed between said heat source and said thermocouple including said temperature measuring tip and said stress relief zone, whereby said stress relief zone is protected from the intense heating to which it might otherwise be subjected.

3. A system as set forth in claim 2 and further including:

a. a metallic member securely fastened to said body, said metallic member having means for mounting said thermocouple therein with said temperature measuring tip in intimate contact with said body, said metallic member providing a large effective heating area for absorbing radiation from said heat source and thereby possibly raising the temperature sensed by said thermocouple above the actual temperature of said body unless said hood means is provided; and
   b. means for mounting said hood means in place over said thermocouple and over said metallic member, and including means for securing said hood means directly to said metallic member.

4. A system as set forth in claim 3 and wherein said mounting means for said hood means includes means for permitting movement of said hood means to a position which allows access to and possible replacement of said thermocouple.

5. A system as set forth in claim 4 wherein said mounting means for said hood means includes a hinge member extending through said metallic member and secured to said hood means and a removable lock member extending through said metallic member and secured to said hood means.

6. A system as set forth in claim 5 wherein said hood means is open at its ends to permit a substantially unimpeded convective air flow under and through said hood means.

* * * * *